United States Patent
Huang et al.

(10) Patent No.: US 11,947,753 B2
(45) Date of Patent: Apr. 2, 2024

(54) TOUCH DRIVING CIRCUIT, DRIVING CHIP, AND TOUCH DISPLAY DEVICE

(71) Applicant: SHENZHEN GOODIX TECHNOLOGY CO., LTD., Guangdong (CN)

(72) Inventors: Long Huang, Guangdong (CN); Chenyang Kong, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/234,245

(22) Filed: Aug. 15, 2023

(65) Prior Publication Data
US 2023/0384880 A1    Nov. 30, 2023

Related U.S. Application Data

(63) Continuation of application No. PCT/CN2021/079092, filed on Mar. 4, 2021.

(51) Int. Cl.
G06F 3/041       (2006.01)
G06F 3/044       (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS 8,432,364 B2    4/2013  Krah
9,377,910 B2    6/2016  Ahn et al.
(Continued)

FOREIGN PATENT DOCUMENTS

CN    101960415 A    1/2011
CN    103488362 A    1/2014
(Continued)

OTHER PUBLICATIONS

International Search Report and Written Opinion dated Dec. 6, 2021 received in International Application No. PCT/CN2021/079092.
(Continued)

*Primary Examiner* — Stephen T. Reed
(74) *Attorney, Agent, or Firm* — Scully, Scott, Murphy & Presser, P.C.

(57) ABSTRACT

The present application provides a touch driving circuit, a driving chip and a touch display device. The touch driving circuit is configured to output a driving signal to drive a touch electrode of the touch display device; and the touch driving circuit includes: a power supply voltage generation circuit, a switching circuit and a first energy storage capacitor, where a first input end of the switching circuit is connected to the power supply voltage generation circuit; a second input end of the switching circuit is connected to a ground terminal GND through the first energy storage capacitor; a third input end of the switching circuit is connected to the ground terminal GND; an output end of the switching circuit is connected to the touch electrode; the power supply voltage generation circuit is configured to generate a first positive voltage; the switching circuit is configured to control the touch electrode to be connected to the power supply voltage generation circuit during a first period of time, and control the touch electrode to be con- nected to the first energy storage capacitor during a second
(Continued)

period of time, and control the touch electrode to be connected to the ground terminal GND during a third period of time. The touch driving circuit has lower driving power consumption.

12 Claims, 6 Drawing Sheets

(56) References Cited

U.S. PATENT DOCUMENTS

| | | | |
|---|---|---|---|
| 2009/0212642 A1* | 8/2009 | Krah | G06F 1/3262 307/109 |
| 2014/0313157 A1* | 10/2014 | Ahn | G06F 3/0446 345/174 |
| 2015/0053947 A1 | 2/2015 | Qing et al. | |
| 2015/0317033 A1* | 11/2015 | Chen | G06F 3/0418 345/174 |

FOREIGN PATENT DOCUMENTS

| | | |
|---|---|---|
| CN | 107783688 A | 3/2018 |
| CN | 109388264 A | 2/2019 |
| CN | 109992158 A | 7/2019 |
| KR | 20170046851 A | 5/2017 |

OTHER PUBLICATIONS

International Search Report dated Dec. 6, 2021 issued in PCT/CN2021/079092.
Office Action dated Dec. 30, 2021 issued in 202110241208.2 by CNIPA.
Notice of Allowance dated Apr. 22, 2022 issued in 202110241208.2 by CNIPA.

* cited by examiner

TOUCH DRIVING CIRCUIT, DRIVING CHIP, AND TOUCH DISPLAY DEVICE

CROSS REFERENCE

This application is a continuation of International Application No. PCT/CN2021/079092, filed on Mar. 4, 2021, the disclosure of which is hereby incorporated by reference in its entirety.

TECHNICAL FIELD

Embodiments of the present application relate to the technical field of electronic circuits, and in particular to a touch driving circuit, a driving chip, and a touch display device.

BACKGROUND

A capacitive touch display device generally includes a display, a touch electrode and a touch driving circuit. The touch driving circuit is used to charging and discharging the touch electrode, and when a human body or another conductor touches the display, a capacitance variation at a corresponding coordinate position of the display can be detected, thereby determining a user's operation.

As shown in FIG. 1, it is a schematic structural diagram of a traditional touch driving circuit. The touch driving circuit utilizes an inverter INV to provide a driving signal to drive the touch electrode. A voltage $V_{DD}$ is a power supply voltage, capacitance $C_L$ represents equivalent capacitance of the touch electrode, and resistance $R_L$ represents equivalent impedance (i.e., driving impedance) during coding. Power consumption of the touch driving circuit is mainly divided into two parts, one part is loss on a resistor $R_L$ when a capacitor $C_L$ is charged, and the other part is loss on the resistor $R_L$ when the capacitor $C_L$ is discharged; during one period T of a driving signal (hereinafter abbreviated as one period T), the loss of the above two parts is both $\frac{1}{2}*C_L*V_{DD}^2*f$, and therefore driving power consumption of the touch driving circuit shown in FIG. 1 in one period T is $C_L*V_{DD}^2*f$ in total, where $f=1/T$, and is the frequency of the driving signal.

At present, organic light emitting diode (OLED) display technology has many obvious advantages in display performance compared with traditional liquid crystal display (LCD) technology, for example, an OLED screen is thinner and lighter, and has a wide viewing angle, low temperature resistance, ecological environmental protection and other characteristics, and therefore the OLED screen has been widely used. However, compared with an LCD screen, the OLED screen has a load capacitor (an equivalent capacitor $C_L$) with a significantly larger capacitance value, which leads to increased power consumption of the OLED screen, and makes it difficult to meet the requirements of low power consumption for touch detection.

SUMMARY

In view of this, embodiments of the present application provide a touch driving circuit, a driving chip, and a touch display device, so as to reduce driving power consumption.

In a first aspect, an embodiment of the present application provides a touch driving circuit configured to output a driving signal to drive a touch electrode of a touch display device, and the touch driving circuit includes: a power supply voltage generation circuit, a switching circuit and a first energy storage capacitor; where a first input end of the switching circuit is connected to the power supply voltage generation circuit; a second input end of the switching circuit is connected to a ground terminal GND through the first energy storage capacitor; a third input end of the switching circuit is connected to the ground terminal GND; and an output end of the switching circuit is connected to the touch electrode; the power supply voltage generation circuit is configured to generate a first positive voltage; and the switching circuit is configured to control the touch electrode to be connected to the power supply voltage generation circuit during a first period of time, the touch electrode being charged with the first positive voltage, so that a voltage at two ends of the touch electrode is equal to the first positive voltage; control the touch electrode to be connected to the first energy storage capacitor during a second period of time, the first energy storage capacitor being configured to store charges released by the touch electrode, so that the voltage at the two ends of the touch electrode is equal to a second positive voltage; and control the touch electrode to be connected to the ground terminal GND during a third period of time, the touch electrode being discharged to the ground terminal GND, so that the voltage at the two ends of the touch electrode is equal to a zero voltage; where the second positive voltage is lower than the first positive voltage and higher than the zero voltage.

By setting the first energy storage capacitor and using the first energy storage capacitor to store charges released by the touch electrode, the second positive voltage is introduced between the first positive voltage and the zero voltage as an intermediate level, which reduces loss on driving impedance during a process of the voltage at the two ends of the touch electrode dropping from the first positive voltage to the zero voltage (i.e., a discharging process), and thus reduces driving power consumption of the touch driving circuit.

Optionally, the touch driving circuit further includes: a second energy storage capacitor; where a fourth input end of the switching circuit is connected to the ground terminal GND through the second energy storage capacitor; and a fifth input end of the switching circuit is connected to the power supply voltage generation circuit; the power supply voltage generation circuit is further configured to generate a first negative voltage; and the switching circuit is further configured to control the touch electrode to be connected to the second energy storage capacitor during a fourth period of time, the second energy storage capacitor being configured to transfer the stored charges to the touch electrode, so that the voltage at the two ends of the touch electrode is equal to a second negative voltage; and control the touch electrode to be connected to the power supply voltage generation circuit during a fifth period of time, the touch electrode being charged with the first negative voltage, so that the voltage at the two ends of the touch electrode is equal to the first negative voltage; where the second negative voltage is higher than the first positive voltage and lower than the zero voltage.

Optionally, the switching circuit is further configured to control the touch electrode to be connected to the second energy storage capacitor during a sixth period of time, the second energy storage capacitor being configured to store the charges released by the touch electrode, so that the voltages at the two ends of the touch electrode is equal to the second negative voltage; control the touch electrode to be connected to the ground terminal GND during a seventh period of time, the touch electrode being discharged to the ground terminal GND, so that the voltage at the two ends of the touch electrode is equal to the zero voltage; and control the touch electrode to be connected to the first energy storage capacitor during an eighth period of time, the first energy storage capacitor being configured to transfer the stored charges to the touch electrode, so that the voltage at the two ends of the touch electrode is equal to the second positive voltage.

Optionally, the switching circuit further includes: a first switching circuit, a second switching circuit, a third switching circuit, a fourth switching circuit and a fifth switching circuit; an input end of the first switching circuit is the first input end of the switching circuit, and an output end of the first switching circuit is connected to the output end of the switching circuit; an input end of the second switching circuit is the second input end of the switching circuit, and an output end of the second switching circuit is connected to the output end of the switching circuit; an input end of the third switching circuit is the third input end of the switching circuit, and an output end of the third switching circuit is connected to the output end of the switching circuit; an input end of the fourth switching circuit is the fourth input end of the switching circuit, and an output end of the fourth switching circuit is connected to the output end of the switching circuit; and an input end of the fifth switching circuit is the fifth input end of the switching circuit, and an output end of the fifth switching circuit is connected to the output end of the switching circuit.

Optionally, the first switching circuit is turned on during the first period of time; the second switching circuit is turned on during the second period of time; the third switching circuit is turned on during the third period of time; the fourth switching circuit is turned on during the fourth period of time; the fifth switching circuit is turned on during the fifth period of time; the fourth switching circuit is turned on during the sixth period of time; the third switching circuit is turned on during the seventh period of time; and the second switching circuit is turned on during the eighth period of time; and when any of switching circuits is turned on, other four switching circuits are all turned off.

Optionally, the touch driving circuit further includes a first voltage-bearing transistor and a second voltage-bearing transistor; the first switching circuit further includes a first MOS transistor; the second switching circuit further includes a second MOS transistor; the fourth switching circuit further includes a fourth MOS transistor; the fifth switching circuit further includes a fifth MOS transistor; and the third switching circuit further includes a third MOS transistor and a sixth MOS transistor; the first MOS transistor, the sixth MOS transistor and the first voltage-bearing transistor are P-type MOS transistors, and the second MOS transistor, the third MOS transistor, the fourth MOS transistor, the fifth MOS transistor and the second voltage-bearing transistor are N-type MOS transistors; a source of the first MOS transistor is connected to the first positive voltage, and a drain of the first MOS transistor is connected to a source of the first voltage-bearing transistor; a source of the second MOS transistor is connected to the source of the first voltage-bearing transistor, and a drain of the second MOS transistor is connected to a first end of the first energy storage capacitor; a source of the third MOS transistor is connected to the ground terminal GND, and a drain of the third MOS transistor is connected to the source of the first voltage-bearing transistor; a source of the fourth MOS transistor is connected to a first end of the second energy storage capacitor, and a drain of the fourth MOS transistor is connected to a source of the second voltage-bearing transistor; a source of the fifth MOS transistor is connected to the first negative voltage, and a drain of the fifth MOS transistor is connected to the source of the second voltage-bearing transistor; a source of the sixth MOS transistor is connected to the ground terminal GND, and a drain of the sixth MOS transistor is connected to the source of the second voltage-bearing transistor; second ends of the first energy storage capacitor and the second energy storage capacitor are both connected to the ground terminal GND; and drains of the first voltage-bearing transistor and the second voltage-bearing transistor are both connected to the touch electrode; and the first voltage-bearing transistor is configured to prevent voltages at two ends of the first MOS transistor, the second MOS transistor and the third MOS transistor from exceeding a withstand voltage; and the second voltage-bearing transistor is configured to prevent voltages at two ends of the fourth MOS transistor, the fifth MOS transistor and the sixth MOS transistor from exceeding a withstand voltage.

Optionally, during the first period of time, the first MOS transistor is turned on, gates of the first voltage-bearing transistor and the second voltage-bearing transistor are connected to the ground terminal GND, and other five MOS transistors are cut off; during the second period of time, the second MOS transistor is turned on, the gates of the first voltage-bearing transistor and the second voltage-bearing transistor are connected to the ground terminal GND, and the other five MOS transistors are cut off; during the third period of time, the third MOS transistor is turned on, a voltage connected to a gate of the first voltage-bearing transistor is equal to a difference obtained by subtracting the first positive voltage from the second positive voltage, a gate of the second voltage-bearing transistor is connected to the ground terminal GND, and the other five MOS transistors are cut off; during the fourth period of time, the fourth MOS transistor is turned on, the gates of the first voltage-bearing transistor and the second voltage-bearing transistor are connected to the ground terminal GND, and the other five MOS transistors are cut off; during the fifth period of time, the fifth MOS transistor is turned on, the gates of the first voltage-bearing transistor and the second voltage-bearing transistor are connected to the ground terminal GND, and the other five MOS transistors are cut off; during the sixth period of time, the fourth MOS transistor is turned on, the gates of the first voltage-bearing transistor and the second voltage-bearing transistor are connected to the ground terminal GND, and the other five MOS transistors are cut off; during the seventh period of time, the sixth MOS transistor is turned on, the gate of the first voltage-bearing transistor is connected to the ground terminal GND, a voltage connected to the gate of the second voltage-bearing transistor is equal to a difference obtained by subtracting the first negative voltage from the second negative voltage, and the other five MOS transistors are cut off; and during the eighth period of time, the second MOS transistor is turned on, the gates of the first voltage-bearing transistor and the second voltage-bearing transistor are connected to the ground terminal GND, and the other five MOS transistors are cut off.

Optionally, a signal amplitude of the driving signal during one period is equal to the first positive voltage, the second positive voltage, the zero voltage, the second negative voltage, the first negative voltage, the second negative voltage, the zero voltage, and the second positive voltage in sequence.

Optionally, the power supply voltage generation circuit further includes a positive and negative voltage conversion circuit; and the positive and negative voltage conversion circuit is configured to convert the first positive voltage into the first negative voltage.

Optionally, a capacitance value of the first energy storage capacitor or the second energy storage capacitor is 50 times greater than an equivalent capacitance value of the touch electrode.

Optionally, the second positive voltage is equal to ½ of the first positive voltage, and the second negative voltage is equal to ½ of the first negative voltage.

In a second aspect, an embodiment of the present application provides a touch driving chip, including the touch driving circuit provided in the first aspect or any optional manner of the first aspect.

In a third aspect, an embodiment of the present application provides a touch display device, including the touch driving chip provided in the third aspect.

It can be understood that the touch driving chip provided in the second aspect and the touch display device provided in the third aspect both apply the corresponding touch driving circuit provided above, and therefore, for beneficial effects realized thereby, reference can be made to beneficial effects of the corresponding touch driving circuit provided above, which will not be repeated here.

BRIEF DESCRIPTION OF THE DRAWINGS

One or more embodiments are exemplified by pictures in the corresponding accompanying drawings, and these exemplifications are not intended to limit the embodiments. When the following description refers to the accompanying drawings, the same numerals in different drawings represent the same elements. Unless otherwise stated, the pictures in the drawings are not limited to scale.

DESCRIPTION OF EMBODIMENTS

Technical solutions in embodiments of the present application will be clearly and completely described below in conjunction with the accompanying drawings. Apparently, the described embodiments are part of the embodiments of the present application, but not all of the embodiments.

Term used in the present application is for the purpose of describing particular embodiments only and is not intended to limit the present application. As used in the present application and the appended claims, the singular forms "a", "the", and "said" are intended to include the plural forms as well, unless the context clearly dictates otherwise. It should also be understood that the term "and/or" as used herein refers to and includes any and all possible combinations of one or more of the associated listed items.

In addition, terms such as "first" and "second" are only used to distinguish similar objects, and cannot be understood as indicating or implying relative importance, or implicitly indicating the number of indicated technical features. Thus, a feature defined as "first", "second", etc. may explicitly or implicitly include one or more of the features.

Embodiments of the present application provide a touch driving circuit, a driving chip, and a touch display device. The touch driving circuit may be applied in the touch display device, and outputs a driving signal to drive a touch electrode of the touch display device. The touch display device may also include a display, and a user may use a finger or another conductor to touch an icon or text on the display to implement a corresponding touch operation. Examples of the display include but are not limited to a liquid crystal display (LCD), an organic light emitting diode (OLED) display, a plasma display panel (PDP) and a cathode ray tube (CRT) display.

Figure 2:
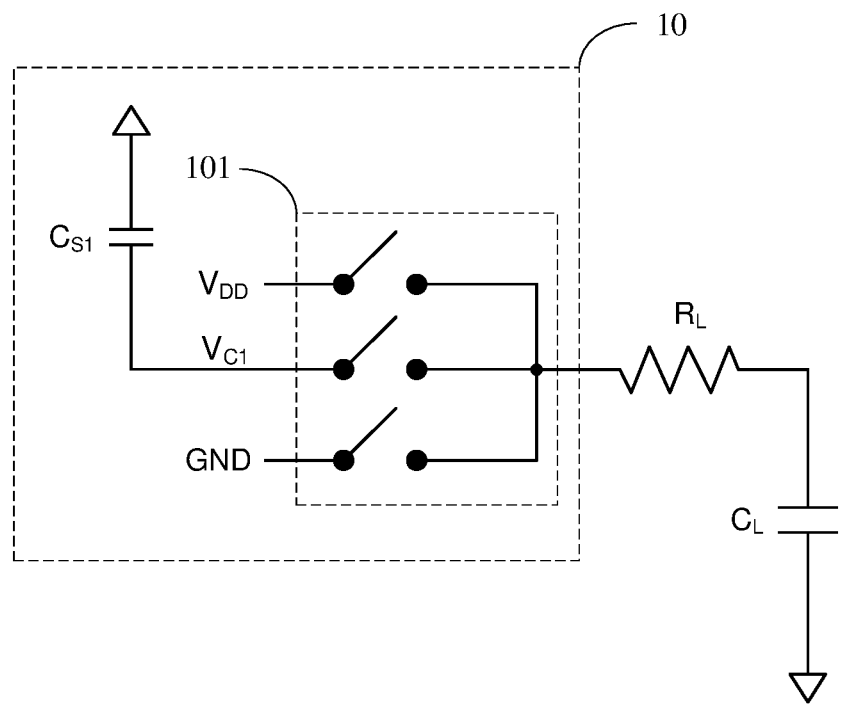
FIG. 2 is a schematic structural diagram of a touch driving circuit provided by an embodiment of the present application.

As shown in FIG. 2, it is a schematic structural diagram of a touch driving circuit provided by an embodiment of the present application. Resistance R L represents driving impedance (including equivalent impedance of a touch electrode and a touch driving circuit); and capacitance $C_L$ represents equivalent capacitance of the touch electrode. The touch driving circuit 10 includes a switching circuit 101, and a first input end of the switching circuit 101 is connected to a first positive voltage $V_{DD}$, a second input end is connected to a ground terminal GND through a first energy storage capacitor $C_{S1}$, a third input end is connected to the ground terminal GND, and an output end is connected to the touch electrode. The first positive voltage $V_{DD}$ may be a power supply voltage generated by a power supply voltage generation circuit. The switching circuit 101 can control connection objects of the touch electrode in the following order: the touch electrode is controlled to be connected to the power supply voltage generation circuit during a first period of time, and the touch electrode is charged with the first positive voltage, so that a voltage at two ends of the touch electrode is equal to the first positive voltage $V_{DD}$; the touch electrode is controlled to be connected to the first energy storage capacitor $C_{S1}$ during a second period of time, and the first energy storage capacitor $C_{S1}$ can store charges released by the touch electrode, so that the voltage at the two ends of the touch electrode is equal to a second positive voltage $V_{C1}$; and the touch electrode is controlled to be connected to the ground terminal GND during a third period of time, and the touch electrode is discharged to the ground, so that the voltage at the two ends of the touch electrode is equal to a zero voltage.

The power supply voltage generation circuit may be provided separately for providing a power supply voltage to the touch driving circuit, or may be shared with another circuit module in a touch detection chip.

During the above second period of time, the touch electrode transfers a part of positive charges to the first energy storage capacitor $C_{S1}$ until the voltage at the two ends of the touch electrode is equal to a voltage at two ends of the first energy storage capacitor $C_{S1}$, so that the voltage at the two ends of the touch electrode changes from the first positive voltage $V_{DD}$ to the second positive voltage $V_{C1}$, and therefore the second positive voltage $V_{C1}$ is lower than the first positive voltage $V_{DD}$ and higher than the zero voltage, that is, satisfying $V_{DD} > V_{C1} > 0$.

Figure 1:
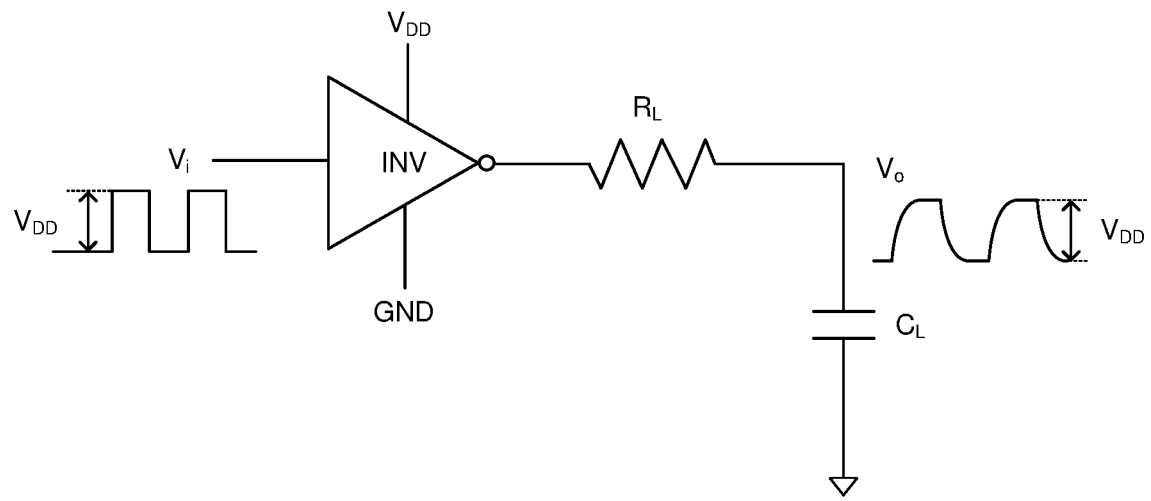
FIG. 1 is a schematic structural diagram of a traditional touch driving circuit.

When a capacitance value of the first energy storage capacitor $C_{S1}$ is much greater than a capacitance value of the capacitor $C_L$, the second positive voltage $V_{C1}$ is approximately equal to $V_{DD}/2$, and therefore, during the above discharging process of the touch electrode, loss on the resistor $R_L$ is approximately equal to $\frac{1}{4} * C_L * V_{DD}^2 * f$, and is only 50% of that of the traditional touch driving circuit shown in FIG. 1. Specifically, if the capacitance value of the first energy storage capacitor $C_{S1}$ is 30 times greater than the capacitance value of the capacitor $C_L$, it can be determined that the capacitance value of the first energy storage capacitor $C_{S1}$ is much greater than the capacitance value of the capacitor $C_L$; preferably, the capacitance value of the first energy storage capacitor $C_{S1}$ can be made 50-100 times greater than the capacitance value of the capacitor $C_L$.

In addition, when the capacitance value of the first energy storage capacitor $C_{S1}$ is not much greater than the capacitance value of the capacitor $C_L$, the first energy storage capacitor $C_{S1}$ can also introduce an intermediate level lower than the first positive voltage $V_{DD}$ and higher than the zero voltage, thereby reducing the loss on the resistor $R_L$ during the discharging process of the touch electrode, that is, a loss value can be made less than $\frac{1}{2} * C_L * V_{DD}^2 * f$, but since the intermediate level is not approximately equal to $V_{DD}/2$, it will cause the loss value to be greater than $\frac{1}{4} * C_L * V_{DD}^2 * f$.

Figure 3:
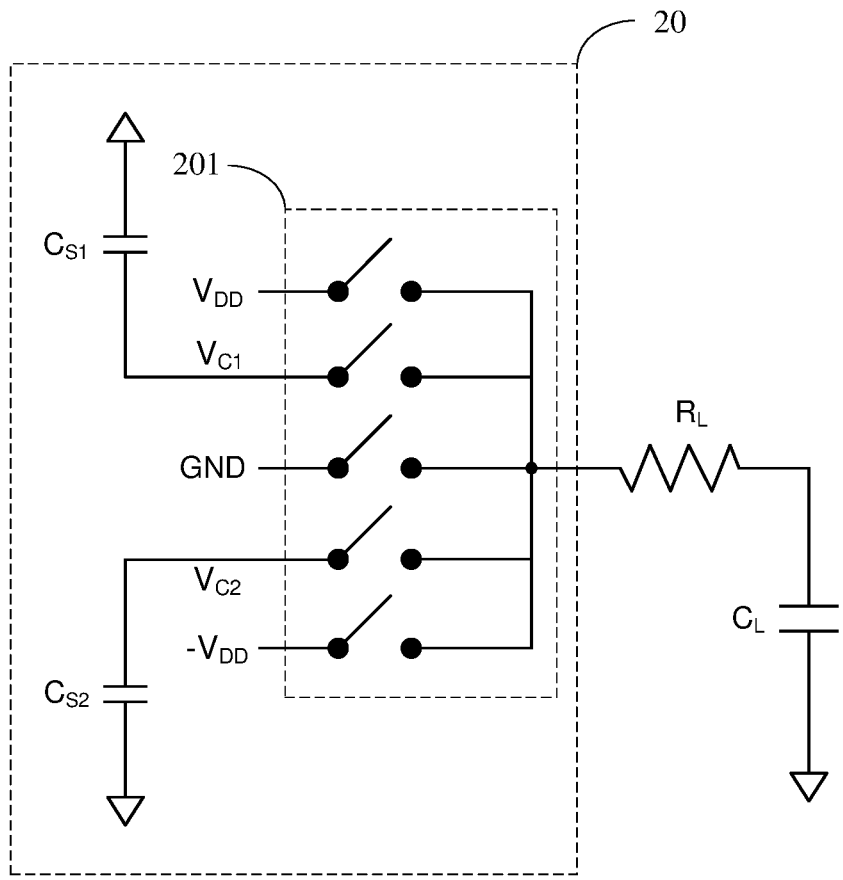
FIG. 3 is a schematic structural diagram of another touch driving circuit provided by an embodiment of the present application.

As shown in FIG. 3, it is a schematic structural diagram of another touch driving circuit provided by an embodiment of the present application. The touch driving circuit 20 includes a switching circuit 201, and a first input end of the switching circuit 201 is connected to a first positive voltage $V_{DD}$, a second input end is connected to a ground terminal GND through a first energy storage capacitor $C_{S1}$, a third input end is connected to the ground terminal GND, a fourth input end is connected to the ground terminal GND through a second energy storage capacitor $C_{S2}$, a fifth input end is connected to a first negative voltage $-V_{DD}$, and an output end is connected to a touch electrode. Both the first positive voltage $V_{DD}$ and the first negative voltage $-V_{DD}$ are power supply voltages generated by a power supply voltage generation circuit. The switching circuit 201 can control connection objects of the touch electrode in the following order: the touch electrode is controlled to be connected to the power supply voltage generation circuit during a first period of time, and the touch electrode is charged with the first positive voltage, so that a voltage at two ends of the touch electrode is equal to the first positive voltage $V_{DD}$; the touch electrode is controlled to be connected to the first energy storage capacitor $C_{S1}$ during a second period of time, the first energy storage capacitor $C_{S1}$ can store charges released by the touch electrode, so that the voltage at the two ends of the touch electrode is equal to a second positive voltage $V_{C1}$; the touch electrode is controlled to be connected to the ground terminal GND during a third period of time, the touch electrode is discharged to the ground, so that the voltage at the two ends of the touch electrode is equal to a zero voltage; the touch electrode is controlled to be connected to the second storage energy capacitor $C_{S2}$ during a fourth period of time, the second energy storage capacitor $C_{S2}$ transfers the stored charges to the touch electrode, so that the voltage at the two ends of the touch electrode is equal to a second negative voltage $V_{C2}$; and the touch electrode is controlled to be connected to the first negative voltage $-V_{DD}$ during a fifth period of time, and the touch electrode is charged with the first negative voltage $-V_{DD}$, so that the voltage at the two ends of the touch electrode is equal to the first negative voltage $-V_{DD}$.

The power supply voltage generation circuit may include a positive and negative voltage conversion circuit, and the positive and negative voltage conversion circuit may convert the first positive voltage $V_{DD}$ into the first negative voltage $-V_{DD}$, and an example of the positive and negative voltage conversion circuit includes a negative voltage charge pump circuit.

The above charge transfer process during the fourth period of time is based on the fact that the second energy storage capacitor $C_{S2}$ has already stored a certain amount of negative charges. During the fifth period of time, the touch electrode is further charged with the first negative voltage $-V_{DD}$, so that the voltage at the two ends of the touch electrode changes from the second negative voltage $V_{C2}$ to the first negative voltage $-V_{DD}$, and therefore the second negative voltage $V_{C2}$ is higher than the first negative voltage $-V_{DD}$ and lower than the zero voltage, that is, satisfying $0 > V_{C2} > -V_{DD}$, $|V_{DD}| > |V_{C2}| > 0$.

By setting the first negative voltage $-V_{DD}$, a signal amplitude of a driving signal output by the touch driving circuit can be increased from $V_{DD}$ to $2V_{DD}$, which is beneficial to improve the resolution of touch detection. For the traditional touch driving circuit shown in FIG. 1, if a signal amplitude of a driving signal is increased to $2V_{DD}$, driving power consumption in one period T will increase to $4 * C_L * V_{DD}^2 * f$; and loss on the resistor $R_L$ during the discharging process of the touch electrode is equal to $2 * C_L * V_{DD}^2 * f$. However, in this embodiment, the first energy storage capacitor $C_{S1}$ and the second energy storage capacitor $C_{S2}$ are used to recycle the transferred charges during the discharging process of the touch electrode, and no additional power consumption will be generated during this process. Therefore, during the discharging process of the touch electrode, the loss on the resistor $R_L$ is equal to $\frac{1}{2} * C_L * V_{DD}^2 * f$, which is only 25% of that of the traditional touch driving circuit.

Based on the content disclosed in the above embodiment, in this embodiment, the switching circuit can further control the touch electrode to be connected to the second energy storage capacitor $C_{S2}$ during a sixth period of time, the second energy storage capacitor $C_{S2}$ storing the charges released by the touch electrode, so that the voltage at the two ends of the touch electrode is equal to the second negative voltage $V_{C2}$; control the touch electrode to be connected to the ground terminal GND during a seventh period of time, the touch electrode being discharged to the ground, so that the voltage at the two ends of the touch electrode is equal to the zero voltage; and control the touch electrode to be connected to the first energy storage capacitor $C_{S1}$ during an eighth period of time, the first energy storage capacitor $C_{S1}$ transferring the stored charges to the touch electrode, so that the voltage at the two ends of the touch electrode is equal to the second positive voltage $V_{C1}$. So far, the switching circuit has completed the operation in one operating period, and next, according to the operation during the first period of time again, the first positive voltage $V_{DD}$ can be controlled to charge the touch electrode, to continue a cycle periodically, so that the signal amplitude of the driving signal output by the touch driving circuit during one period is equal to the first positive voltage, the second positive voltage, the zero voltage, the second negative voltage, the first negative voltage, the second negative voltage, the zero voltage and the second positive voltage in sequence.

When the touch driving circuit is in an initial state, the amount of charges stored in the first energy storage capacitor $C_{S1}$ and the second energy storage capacitor $C_{S2}$ are both zero, and at this time, the switching circuit can be made to perform control according to the above operation sequence from the first period of time to the eighth period of time in sequence: the touch electrode is charged with the first positive voltage $V_{DD}$ until the voltage at the two ends of the touch electrode is equal to the first positive voltage $V_{DD}$; the touch electrode is connected to the first energy storage capacitor $C_{S1}$ and transfers a part of positive charges to the first energy storage capacitor $C_{S1}$ until the voltage at the two ends of the touch electrode is equal to the second positive voltage $V_{C1}$; the touch electrode is grounded and discharged to the ground until the voltage at the two ends of the touch electrode is equal to 0; the touch electrode is connected to the second energy storage capacitor $C_{S2}$, but since the amount of charges stored in the second energy storage capacitor $C_{S2}$ is 0, no charge transfer occurs between the touch electrode and the second energy storage capacitor $C_{S2}$; the touch electrode is charged with the first negative voltage $-V_{DD}$ until the voltage at the two ends of the touch electrode is equal to the first negative voltage $-V_{DD}$; the touch electrode is connected to the second energy storage capacitor $C_{S2}$ again, and the touch electrode is discharged to the second energy storage capacitor $C_{S2}$, and the second energy storage capacitor $C_{S2}$ stores the charges released by the touch electrode, until the voltage at the two ends of the touch electrode is equal to the second negative voltage $V_{C2}$; the touch electrode is grounded again and discharged to the ground until the voltage at the two ends of the touch electrode is equal to 0; the touch electrode is connected to the first energy storage capacitor $C_{S1}$, and the first energy storage capacitor $C_{S1}$ transfers the stored charges to the touch electrode, and charges the touch electrode until the voltage at the two ends of the touch electrode is equal to the second positive voltage $V_{C1}$; then, the above process is cycled periodically, and when the touch electrode is controlled again to switch from being connected to the ground to being connected to the second energy storage capacitor $C_{S2}$, the second energy storage capacitor $C_{S2}$ can transfer the stored charges to the touch electrode to charge the touch electrode until the voltage at the two ends of the touch electrode is equal to the second negative voltage $V_{C2}$. Therefore, the amount of charges stored in the first energy storage capacitor $C_{S1}$ and the second energy storage capacitor $C_{S2}$ can gradually tend to stabilize, so that values of the second positive voltage $V_{C1}$ and the second negative voltage $V_{C2}$ gradually tend to stabilize, and when the capacitance values of the first energy storage capacitor $C_{S1}$ and the second energy storage capacitor $C_{S2}$ are much greater than the capacitance value of the capacitor $C_L$, the amounts of charges stored in the first energy storage capacitor $C_{S1}$ and the second energy storage capacitor $C_{S2}$ almost do not change before and after charge transfer with the capacitor $C_L$.

Based on the content disclosed in the above embodiments, in this embodiment, the switching circuit may further include a first switching circuit, a second switching circuit, a third switching circuit, a fourth switching circuit and a fifth switching circuit. Specifically, an input end of the first switching circuit is the first input end of the switching circuit, and an output end of the first switching circuit is connected to the output end of the switching circuit; an input end of the second switching circuit is the second input end of the switching circuit, and an output end of the second switching circuit is connected to the output end of the switching circuit; an input end of the third switching circuit is the third input end of the switching circuit, and an output end of the third switching circuit is connected to the output end of the switching circuit; an input end of the fourth switching circuit is the fourth input end of the switching circuit, and an output end of the fourth switching circuit is connected to the output end of the switching circuit; and an input end of the fifth switching circuit is the fifth input end of the switching circuit, and an output end of the fifth switching circuit is connected to the output end of the switching circuit.

When any one of the above switching circuits is turned on, the other four switching circuits are kept turned off, that is, only one switching circuit is turned on at a single moment. In this embodiment, the above five switching circuits may be periodically turned on in the following order.

During the first period of time, only the first switching circuit is turned on, and the touch electrode is charged with the first positive voltage $V_{DD}$, so that the voltage at the two ends of the touch electrode is equal to the first positive voltage $V_{DD}$. During the second period of time, only the second switching circuit is turned on, and the touch electrode is connected to the first energy storage capacitor $C_{S1}$, and the first energy storage capacitor $C_{S1}$ stores the charges released by the touch electrode, so that the voltage at the two ends of the touch electrode is equal to the second positive voltage $V_{C1}$. During the third period of time, only the third switching circuit is turned on, the touch electrode is connected to the ground terminal GND, and the touch electrode is discharged to the ground, so that the voltage at the two ends of the touch electrode is equal to the zero voltage. During the fourth period of time, only the fourth switching circuit is turned on, the touch electrode is connected to the second energy storage capacitor $C_{S2}$, and the second energy storage capacitor $C_{S2}$ transfers the stored charges to the touch electrode, so that the voltage at the two ends of the touch electrode is equal to the second negative voltage $V_{C2}$. During the fifth period of time, only the fifth switching circuit is turned on, the touch electrode is connected to the first negative voltage $-V_{DD}$, and the touch electrode is charged with the first negative voltage $-V_{DD}$, so that the voltage at the two ends of the touch electrode is equal to the first negative voltage $-V_{DD}$. During the sixth period of time, only the fourth switching circuit is turned on, the touch electrode is connected to the second energy storage capacitor $C_{S2}$, and the second energy storage capacitor $C_{S2}$ stores the charges released by the touch electrode, so that the voltage at the two ends of the touch electrode is equal to the second negative voltage $V_{C2}$ During the seventh period of time, only the third switching circuit is turned on, the touch electrode is connected to the ground terminal GND, and the touch electrode is discharged to the ground, so that the voltage at the two ends of the touch electrode is equal to the zero voltage. During the eighth period of time, the touch electrode is connected to the first energy storage capacitor $C_{S1}$, and the first energy storage capacitor $C_{S1}$ transfers the stored charges to the touch electrode, so that the voltage at the two ends of the touch electrode is equal to the second positive voltage $V_{C1}$.

In addition, when the touch electrode is charged and discharged, the voltage at the two ends of the touch electrode often needs a certain period of time to reach a stable value, and therefore in order to ensure that the touch electrode can be fully charged and discharged during the corresponding period of time, the turn-on time of the first switching circuit, the second switching circuit, the third switching circuit, the fourth switching circuit, and the fifth switching circuit can be set to be greater than or equal to the time when the voltage at the two ends of the electrode is built to the stable value during the corresponding period of time, so as to ensure the signal amplitude of the driving signal output by the touch driving circuit and the driving power consumption of the touch driving circuit can reach designed target values. For example, during the first period of time, the first switching circuit is turned on, and the touch driving circuit outputs the first positive voltage to charge the electrode, and then when the voltage at the two ends of the electrode rises to the stable value, or after the voltage at the two ends of the electrode rises to the stable value, the first switching circuit is controlled to be turned off, and the second switching circuit is turned on; if the first switching circuit is turned off and the second switching circuit is turned on when the voltage at the two ends of the electrode does not rise to the stable value, a positive voltage amplitude of the driving signal will be caused not to reach $V_{DD}$, and further the signal amplitude of the driving signal will be caused not to reach $2V_{DD}$. For another example, during the fourth period of time, the fourth switching circuit is turned on, and the voltage at the two ends of the touch electrode begins to decline from the zero voltage, and if the fourth switching circuit is turned off and the fifth switching circuit is turned on when the voltage at the two ends of the touch electrode does not decline to the stable value, that is, the power supply voltage generation circuit starts to provide the power supply voltage to drive the touch electrode, it is equivalent to that a voltage variation at the two ends of the touch electrode increases when the touch electrode is directly driven by the power supply voltage, which results in larger driving power consumption.

Figure 4:
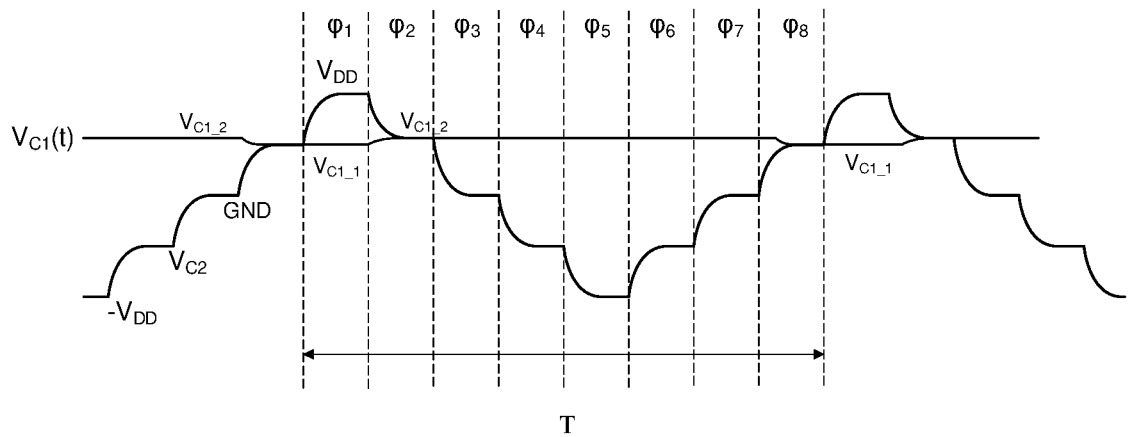
FIG. 4 is a schematic waveform diagram of a driving signal provided by an embodiment of the present application.

As shown in FIG. 4, it is a schematic waveform diagram of a driving signal provided by an embodiment of the present application. The driving signal can be generated by the touch driving circuit shown in FIG. 3, and values of the second positive voltage $V_{C1}$ and the second negative voltage $V_{C2}$ have substantially tended to stabilize. It can be seen that a waveform of the driving signal is in a shape of steps, a signal amplitude is $2V_{DD}$, and during one period $\varphi 1$ the touch electrode is directly charged by the power supply voltage only during the first period of time $\varphi 1$ and the fifth period of time $\varphi 5$, and thus it is equivalent to that actual driving power consumption would be generated only during the first period of time $\varphi 1$ and the fifth period of time $\varphi 5$. Since there is charge transfer between the first energy storage capacitor $C_{S1}$ and the equivalent capacitor $C_L$ of the touch electrode during the operating process of the touch driving circuit, the amount of charges of the first energy storage capacitor $C_{S1}$ and the voltage value at the two ends thereof will change to a certain extent before and after the charge transfer. In order to facilitate the calculation of the driving power consumption of the touch driving circuit, a value obtained after the voltage at the two ends of the first energy storage capacitor $C_{S1}$ tends to stabilize during the first period of time $\varphi 1$ is recorded as $V_{C1\_1}$, and a value obtained after the voltage at the two ends of the first energy storage capacitor $C_{S1}$ tends to stabilize during the second period of time $\varphi 2$ is denoted as $V_{C1\_2}$ in the following.

Figure 5:
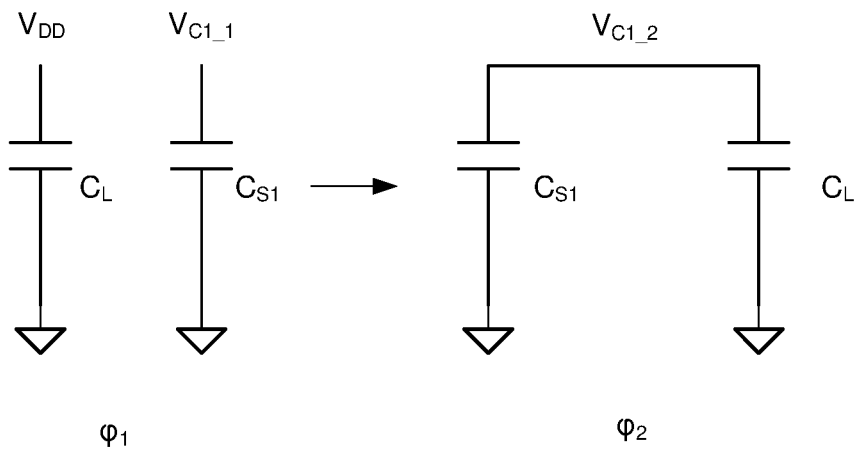
FIG. 5 is a schematic diagram of the principle of charging and discharging a touch electrode by a touch driving circuit during a first period of time φ1 and a second period of time φ2 provided by an embodiment of the present application.

As shown in FIG. 5, it is a schematic diagram of the principle of charging and discharging a touch electrode by a touch driving circuit during a first period of time $\varphi 1$ and a second period of time $\varphi 2$ provided by an embodiment of the present application. The voltage value at the two ends of the first energy storage capacitor $C_{S1}$ has substantially tended to stabilize. It can be seen that during the first period of time $\varphi 1$, the equivalent capacitor $C_L$ of the touch electrode is charged with the first positive voltage $V_{DD}$, and the voltage at the two ends of the first energy storage capacitor $C_{S1}$ is stabilized at a voltage value $V_{C1\_1}$; during the second period of time $\varphi 2$, the equivalent capacitor $C_L$ of the touch electrode transfers positive charges to the first energy storage capacitor $C_{S1}$, so that voltages at the two ends of the equivalent capacitor $C_L$ and the first energy storage capacitor $C_{S1}$ are both stabilized at a voltage value $V_{C1\_2}$, and the voltage value $V_{C1\_2}$ is slightly higher than the voltage value $V_{C1\_1}$. According to the law of conservation of charge, the above voltage values and capacitance values satisfy the following relationship:

$$V_{DD}*C_L+V_{C1\_1}*C_{S1}=V_{C1\_2}*(C_L+C_{S1}) \quad \text{(Formula 1)}$$

Figure 6:
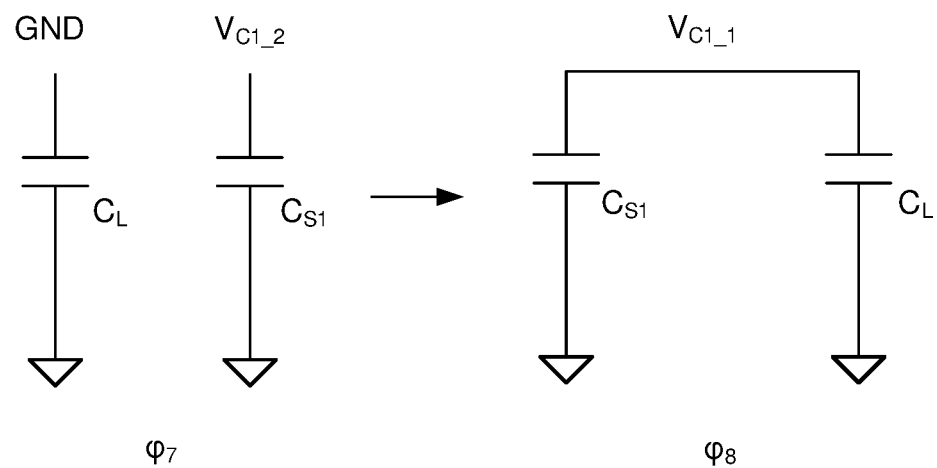
FIG. 6 is a schematic diagram of the principle of charging and discharging a touch electrode by a touch driving circuit during a seventh period of time φ7 and an eighth period of time φ8 provided by an embodiment of the present application.

As shown in FIG. 6, it is a schematic diagram of the principle of charging and discharging a touch electrode by a touch driving circuit during a seventh period of time $\varphi 7$ and an eighth period of time $\varphi 8$ provided by an embodiment of the present application. It can be seen that during the seventh period of time $\varphi 7$, the equivalent capacitor $C_L$ of the touch electrode is discharged to the ground, and the voltage at the two ends of the first energy storage capacitor $C_{S1}$ stabilizes at the voltage value $V_{C1\_2}$; and during the eighth period of time $\varphi 8$, the equivalent capacitor $C_L$ of the touch electrode transfers negative charges to the first energy storage capacitor $C_{S1}$, so that the voltages at the two ends of the equivalent capacitor $C_L$ and the first energy storage capacitor $C_{S1}$ are both stabilized at the voltage value $V_{C1\_1}$. According to the law of conservation of charge, the above voltage values and capacitance values satisfy the following relationship:

$$V_{C1\_2}*C_{S1}=V_{C1\_1}*(C_L+C_{S1}) \quad \text{(Formula 2)}$$

In combination with formula 1 and formula 2, calculation can be performed to obtain:

$$V_{C1\_1}=V_{DD}*C_{S1}/(2C_{S1}+C_L) \quad \text{(Formula 3)}$$

$$V_{C1\_2}=V_{DD}*(C_L+C_{S1})/(2C_{S1}+C_L) \quad \text{(Formula 4)}$$

When the capacitance value of the first energy storage capacitor $C_{S1}$ is much greater than the capacitance value of the capacitor $C_L$ (i.e., $C_{S1}>>C_L$), it can be obtained: $V_{C1\_1} \approx V_{C1\_2} \approx \frac{1}{2}V_{DD}$. Specifically, when the capacitance value of the first energy storage capacitor $C_{S1}$ is 50 to 100 times greater than the capacitance value of the capacitor $C_L$, it can be determined that the capacitance value of the first energy storage capacitor $C_{S1}$ is much greater than the capacitance value of the capacitor $C_L$.

By the same reasoning, when the capacitance value of the second energy storage capacitor $C_{S2}$ is much greater than the capacitance value of the capacitor $C_L$, it can be obtained that the second negative voltage $V_{C2}$ is approximately equal to $-\frac{1}{2}V_{DD}$. Specifically, when the capacitance value of the second energy storage capacitor $C_{S2}$ is 50 to 100 times greater than the capacitance value of the capacitor $C_L$, it can be determined that the capacitance value of the second energy storage capacitor $C_{S2}$ is much greater than the capacitance value of the capacitor $C_L$.

The touch electrode is directly driven by the power supply voltage only during the first time period of time $\varphi 1$ and the fifth period of time $\varphi 5$ in one period T, which is equivalent to that the actual driving power consumption is generated only during these two periods of time, and therefore, when the frequency of the driving signal is $f$, the actual driving power consumption of the touch driving circuit shown in FIG. 3 in one period T can be calculated as $P=(\frac{1}{2}V_{DD})*C_L*f*V_{DD}{}^{*2}=C_L*V_{DD}{}^2*f$, and the signal amplitude of the driving signal is $2V_{DD}$, where $f=1/T$, and is the frequency of the driving signal. However, for a traditional touch driving circuit, when an output driving signal has a signal amplitude of $2V_{DD}$, driving power consumption in one period T is $4*C_L*V_{DD}^2*f$. Therefore, the touch driving circuit provided by the embodiment of the present application obviously has lower driving power consumption while providing a high driving voltage.

It should be noted that the driving power consumption of the touch driving circuit can also be divided into two parts, one part is loss on the resistor $R_L$ when the touch electrode is charged, and the other part is loss on the resistor $R_L$ when the touch electrode is discharged. The loss of these two parts is $½*C_L*V_{DD}^2*f$ in one period T, and therefore the driving power consumption of the touch driving circuit in one period T is $C_L*V_{DD}^2*f$ in total.

In addition, in the embodiment of the present application, the capacitance values of the first energy storage capacitor $C_{S1}$ and the second energy storage capacitor $C_{S2}$ can be set to be equal, and both are much greater than the equivalent capacitance value $C_L$ of the touch electrode, that is, setting that $C_{S1}=C_{S2}\gg C_L$.

Specifically, each switching circuit in the embodiment of the present application may be composed of one or more metal-oxide-semiconductor (MOS) field effect transistors, which are hereinafter referred to as MOS transistors for convenience of description.

Figure 7:
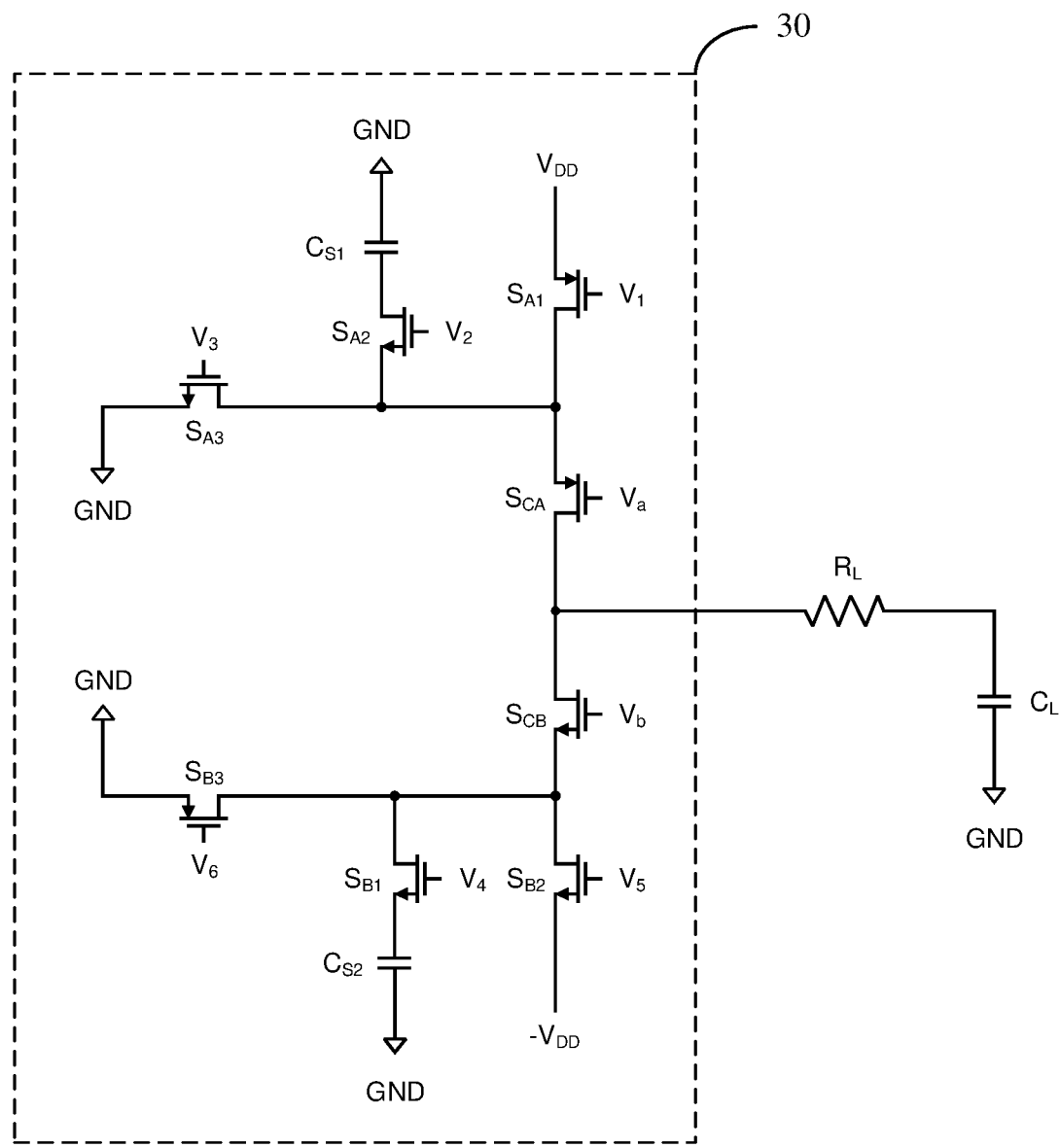
FIG. 7 is a schematic structural diagram of yet another touch driving circuit provided by an embodiment of the present application.

As shown in FIG. 7, it is a schematic structural diagram of yet another touch driving circuit provided by an embodiment of the present application. Based on the content disclosed in the above embodiments, in this embodiment, the first switching circuit further includes a first MOS transistor $S_{A1}$, the second switching circuit further includes a second MOS transistor $S_{A2}$, the fourth switching circuit further includes a fourth MOS transistor $S_{B1}$, the fifth switching circuit further includes a fifth MOS transistor $S_{B2}$, and the third switching circuit further includes a third MOS transistor $S_{A3}$ and a sixth MOS transistor $S_{B3}$, where the first MOS transistor $S_{A1}$, the sixth MOS transistor $S_{B3}$ and a first voltage-bearing transistor $S_{CA}$ are all P-type MOS transistors, and the second MOS transistor $S_{A2}$, the third MOS transistor $S_{A3}$, the fourth MOS transistor $S_{B1}$, the fifth MOS transistor $S_{B2}$ and a second voltage-bearing transistor SCB are all N-type MOS transistors.

Please refer to FIG. 7, specific connection relationships of various elements in a touch driving circuit 30 are as follows: a source of the first MOS transistor $S_{A1}$ is connected to the first positive voltage $V_{DD}$, and a drain of the first MOS transistor $S_{A1}$ is connected to a source of the first voltage-bearing transistor $S_{CA}$; a source of the second MOS transistor $S_{A2}$ is connected to the source of the first voltage-bearing transistor $S_{CA}$, and a drain of the second MOS transistor $S_{A2}$ is connected to a first end of the first energy storage capacitor $C_{S1}$; a source of the third MOS transistor $S_{A3}$ is connected to the ground terminal GND, and a drain of the third MOS transistor $S_{A3}$ is connected to the source of the first voltage-bearing transistor $S_{CA}$; a source of the fourth MOS transistor $S_{B1}$ is connected to a first end of the second energy storage capacitor $C_{S2}$, and a drain of the fourth MOS transistor $S_{B1}$ is connected to a source of the second voltage-bearing transistor $S_{CB}$; a source of the fifth MOS transistor $S_{B2}$ is connected to the first negative voltage $-V_{DD}$, and a drain of the fifth MOS transistor $S_{B2}$ is connected to the source of the second voltage-bearing transistor $S_{CB}$; a source of the sixth MOS transistor $S_{B3}$ is connected to the ground terminal GND, and a drain of the sixth MOS transistor $S_{B3}$ is connected to the source of the second voltage-bearing transistor $S_{CB}$; second ends of the first energy storage capacitor $C_{S1}$ and the second energy storage capacitors $C_{S2}$ are both connected to the ground terminal GND; and drains of the first voltage-bearing transistor $S_{CA}$ and the second voltage-bearing transistor $S_{CB}$ are both connected to the touch electrode.

Since a withstand voltage value of a MOS transistor element processed by a CMOS process is usually equal to the power supply voltage $V_{DD}$, but voltage values at two ends of several MOS transistors in the switching circuit will exceed the withstand voltage value in a certain period of time, it is easy to cause burnout of the MOS transistors and other problems. Therefore, voltage values connected to gates of the first voltage-bearing transistor $S_{CA}$ and the second voltage-bearing transistor $S_{CB}$ can be set respectively according to a voltage difference between two ends of each MOS transistor in different periods of time, so as to prevent the voltages at the two ends of the MOS transistors from exceeding the withstand voltage value, and not to affect the normal charging and discharging of the touch electrode by the touch driving circuit. Specifically, the first voltage-bearing transistor $S_{CA}$ can prevent voltages at two ends of the first MOS transistor $S_{A1}$, the second MOS transistor $S_{A2}$, and the third MOS transistor $S_{A3}$ from exceeding their withstand voltage value; the second voltage-bearing transistor $S_{CB}$ can prevent voltages at two ends of the fourth MOS transistor $S_{B1}$, the fifth MOS transistor $S_{B2}$ and the sixth MOS transistor $S_{B3}$ from exceeding their withstand voltage values. A voltage at two ends of a MOS transistor is specifically a voltage between a source and a drain of the MOS transistor, that is, a source-drain voltage $V_{SD}$ or a drain-source voltage $V_{DS}$.

In this embodiment, in order to make the signal amplitude of the driving signal output by the touch driving circuit 30 equal to the first positive voltage, the second positive voltage, the zero voltage, the second negative voltage, the first negative voltage, the second negative voltage, the zero voltage, and the second positive voltage in sequence during one period, various MOS transistors in the switching circuit can be controlled to be turned on periodically in the following order, and when any of the MOS transistors in the switching circuit is turned on, other five MOS transistors are all kept turned off, that is, only one MOS transistor is turned on in the switching circuit at a single moment.

During the first period of time, the first MOS transistor $S_{A1}$ is turned on, gates of the first voltage-bearing transistor $S_{CA}$ and the second voltage-bearing transistor $S_{CB}$ are connected to the ground terminal GND, and the other five MOS transistors are cut off.

During this period of time, since a gate voltage $V_a$ of the first voltage-bearing transistor $S_{CA}$ is equal to 0, and the source voltage is higher than the gate voltage $V_a$, the first voltage-bearing transistor $S_{CA}$ is turned on, which does not affect output of the first positive voltage $V_{DD}$ by the touch driving circuit 30 to charge the capacitor $C_L$ until the voltage at the two ends of the capacitor $C_L$ is equal to the first positive voltage $V_{DD}$. And since a gate voltage $V_b$ of the second voltage-bearing transistor $S_{CB}$ is equal to 0, the second voltage-bearing transistor $S_{CB}$ can be turned on only when a source voltage of the second voltage-bearing transistor $S_{CB}$ is less than 0, and when the source voltage of the second voltage-bearing transistor $S_{CB}$ is higher than or equal to 0, the second voltage-bearing transistor $S_{CB}$ is cut off, and the second voltage-bearing transistor $S_{CB}$ is turned off during this period of time, which can prevent drain-source voltages of the fourth MOS transistor $S_{B1}$, the fifth MOS transistor $S_{B2}$ and the sixth MOS transistor $S_{B3}$ from exceeding the withstand voltage value $V_{DD}$, and thus prevent the fourth MOS transistor $S_{B1}$, the fifth MOS transistor $S_{B2}$ and the sixth MOS transistor $S_{B3}$ from burning out.

During the second period of time, the second MOS transistor $S_{A2}$ is turned on, the gates of the first voltage-bearing transistor $S_{CA}$ and the second voltage-bearing transistor $S_{CB}$ are connected to the ground terminal GND, and the other five MOS transistors are cut off.

During this period of time, since the gate voltage $V_a$ of the first voltage-bearing transistor $S_{CA}$ is equal to 0, and the source voltage is higher than the gate voltage $V_a$, the first voltage-bearing transistor $S_{CA}$ is turned on, which does not affect discharging of the capacitor $C_L$ to the first energy storage capacitor $C_{S1}$, until the voltage at the two ends of the capacitor $C_L$ is equal to the voltage at the two ends of the first energy storage capacitor $C_{S1}$, that is, the voltage at the two ends of the capacitor $C_L$ changes from the first positive voltage $V_{DD}$ to the second positive voltage $V_{C1}$ ($0<V_{C1}<V_{DD}$). And since the gate voltage $V_b$ of the second voltage-bearing transistor $S_{CB}$ is equal to 0, the second voltage-bearing transistor $S_{CB}$ is cut off, which can prevent the drain-source voltages of the fourth MOS transistor $S_{B1}$, the fifth MOS transistor $S_{B2}$, and the sixth MOS transistor $S_{B3}$ from exceeding the withstand voltage value $V_{DD}$.

During the third period of time, the third MOS transistor $S_{A3}$ is turned on, and the value of the voltage connected to the gate of the first voltage-bearing transistor $S_{CA}$ is equal to a difference obtained by subtracting the first positive voltage $V_{DD}$ from the second positive voltage $V_{C1}$, that is, the value of the voltage connected to the gate of the first voltage-bearing transistor $S_{CA}$ is equal to $V_{C1}$-$V_{DD}$, the gate of the second voltage-bearing transistor $S_{CB}$ is connected to the ground terminal GND, and the other five MOS transistors are cut off.

During this period of time, since the gate voltage $V_a$ of the first voltage-bearing transistor $S_{CA}$ is equal to $V_{C1}$-$V_{DD}$, the gate voltage $V_a<0$, the source voltage is higher than the gate voltage $V_a$, and the first voltage-bearing transistor $S_{CA}$ is turned on, which does not affect the discharging of the capacitor $C_L$ to the ground, so that the voltage at the two ends of the capacitor $C_L$ changes from the second positive voltage $V_{C1}$ to 0. And since the gate voltage $V_b$ of the second voltage-bearing transistor $S_{CB}$ is equal to 0, the second voltage-bearing transistor $S_{CB}$ is cut off, which can prevent the drain-source voltages of the fourth MOS transistor $S_{B1}$, the fifth MOS transistor $S_{B2}$, and the sixth MOS transistor $S_{B3}$ from exceeding the withstand voltage value $V_{DD}$. In addition, when the capacitance value of the first energy storage capacitor $C_{S1}$ is much greater than the capacitance value of the capacitor $C_L$, $V_a=V_{C1}-V_{DD}\approx-\frac{1}{2}V_{DD}$.

During the fourth period of time, the fourth MOS transistor $S_{B1}$ is turned on, the gates of the first voltage-bearing transistor $S_{CA}$ and the second voltage-bearing transistor $S_{CB}$ are connected to the ground terminal GND, and the other five MOS transistors are cut off.

During this period of time, since the gate voltage $V_b$ of the second voltage-bearing transistor $S_{CB}$ is equal to 0, and the source voltage is lower than the gate voltage $V_b$, the second voltage-bearing transistor $S_{CB}$ is turned on, which does not affect the charging of the capacitor $C_L$ by the second energy storage capacitor $C_{S2}$, so that the voltage at the two ends of the capacitor $C_L$ is equal to the voltage at the two ends of the second energy storage capacitor $C_{S2}$, that is, the voltage at the two ends of the capacitor $C_L$ changes from 0 to the second negative voltage $V_{C2}$ ($V_{C2}<0$). And since the gate voltage $V_a$ of the first voltage-bearing transistor $S_{CA}$ is equal to 0, the first voltage-bearing transistor $S_{CA}$ is turned on only when the source voltage of the first voltage-bearing transistor $S_{CA}$ is higher than 0, and the first voltage-bearing transistor $S_{CA}$ is cut off when the source voltage of the first voltage-bearing transistor $S_{CA}$ is less than or equal to 0. Therefore, the first voltage-bearing transistor $S_{CA}$ is cut off during this period of time, which can prevent the source-drain voltages of the first MOS transistor $S_{A1}$, the second MOS transistor $S_{A2}$ and the third MOS transistor $S_{A3}$ from exceeding the withstand voltage value $V_{DD}$.

During the fifth period of time, the fifth MOS transistor $S_{B2}$ is turned on, the gates of the first voltage-bearing transistor $S_{CA}$ and the second voltage-bearing transistor $S_{CB}$ are connected to the ground terminal GND, and the other five MOS transistors are cut off.

During this period of time, since the gate voltage $V_b$ of the second voltage-bearing transistor $S_{CB}$ is equal to 0, and the source voltage is lower than the gate voltage $V_b$, the second voltage-bearing transistor $S_{CB}$ is turned on, which does not affect output of the first negative voltage $-V_{DD}$ by the touch driving circuit 30 to charge the capacitor $C_L$, so that the voltage at the two ends of the capacitor $C_L$ changes from the second negative voltage $V_{C2}$ to the first negative voltage $-V_{DD}$. And since the gate voltage $V_a$ of the first voltage-bearing transistor $S_{CA}$ is equal to 0, the first voltage-bearing transistor $S_{CA}$ is cut off, which can prevent the source-drain voltages of the first MOS transistor $S_{A1}$, the second MOS transistor $S_{A2}$, and the third MOS transistor $S_{A3}$ from exceeding the withstand voltage value $V_{DD}$.

During the sixth period of time, the fourth MOS transistor $S_{B1}$ is turned on, the gates of the first voltage-bearing transistor $S_{CA}$ and the second voltage-bearing transistor $S_{CB}$ are connected to the ground terminal GND, and the other five MOS transistors are cut off.

During this stage, since the gate voltage $V_b$ of the second voltage-bearing transistor $S_{CB}$ is equal to 0, and the source voltage is lower than the gate voltage $V_b$, the second voltage-bearing transistor $S_{CB}$ is turned on, which does not affect the discharging of the capacitor $C_L$ to the second energy storage capacitor $C_{S2}$ until the voltage at the two ends of the capacitor $C_L$ is equal to the voltage at the two ends of the second energy storage capacitor $C_{S2}$, that is, the voltage at the two ends of the capacitor $C_L$ changes from the first negative voltage $-V_{DD}$ to the second negative voltage $V_{C2}$. And since the gate voltage $V_a$ of the first voltage-bearing transistor $S_{CA}$ is equal to 0, the first voltage-bearing transistor $S_{CA}$ is cut off, which can prevent the source-drain voltages of the first MOS transistor $S_{A1}$, the second MOS transistor $S_{A2}$, and the third MOS transistor $S_{A3}$ from exceeding the withstand voltage value $V_{DD}$.

During the seventh period of time, the sixth MOS transistor $S_{B3}$ is turned on, the gate of the first voltage-bearing transistor $S_{CA}$ is connected to the ground terminal GND, and the value of the voltage connected to the gate of the second voltage-bearing transistor $S_{CB}$ is equal to a difference obtained by subtracting the first negative voltage $-V_{DD}$ from the second negative voltage $V_{C2}$, that is, the value of the voltage connected to the gate of the second voltage-bearing transistor $S_{CB}$ is equal to $V_{C2}$-$(-V_{DD})$=$V_{C2}$+$V_{DD}$, and the other five MOS transistors are cut off.

During this period of time, since the gate voltage $V_b$ of the second voltage-bearing transistor $S_{CB}$ is equal to $V_{C2}$+$V_{DD}$, the gate voltage $V_b>0$, the source voltage is lower than the gate voltage $V_b$, and the second voltage-bearing transistor $S_{CB}$ is turned on, which does not affect the discharging of the capacitor $C_L$ to the ground, so that the voltage at the two ends of the capacitor $C_L$ changes from the second negative voltage $V_{C2}$ to 0. And since the gate voltage of the first voltage-bearing transistor $S_{CA}$ is equal to 0, the first voltage-bearing transistor $S_{CA}$ is cut off, which can prevent the source-drain voltages of the first MOS transistor $S_{A1}$, the second MOS transistor $S_{A2}$ and the third MOS transistor $S_{A3}$ from exceeding the withstand voltage value $V_{DD}$. In addition, when the capacitance value of the second storage capacitor $C_{S2}$ is much greater than the capacitance value of the capacitor $C_L$, $V_b = V_{C2} + V_{DD} \approx \frac{1}{2} V_{DD}$.

During the eighth period of time, the second MOS transistor $S_{A2}$ is turned on, the gates of the first voltage-bearing transistor $S_{CA}$ and the second voltage-bearing transistor $S_{CB}$ are connected to the ground terminal GND, and the other five MOS transistors are cut off.

During this period of time, since the gate voltage $V_a$ of the first voltage-bearing transistor $S_{CA}$ is equal to 0, the source voltage is higher than the gate voltage $V_a$, and the first voltage-bearing transistor $S_{CA}$ is turned on, which does not affect charging of the capacitor $C_L$ by the first energy storage capacitor $C_{S1}$, so that the voltage at the two ends of the capacitor $C_L$ changes from 0 to the second positive voltage $V_{C1}$. And since the gate voltage $V_b$ of the second voltage-bearing transistor $S_{CB}$ is equal to 0, the second voltage-bearing transistor $S_{CB}$ is cut off, which can prevent the drain-source voltages of the fourth MOS transistor $S_{A1}$, the fifth MOS transistor $S_{B2}$, and the sixth MOS transistor $S_{B3}$ from exceeding the withstand voltage value $V_{DD}$.

Specifically, a turn-on control voltage of the first MOS transistor $S_{A1}$ can be set to 0, that is, a gate of the first MOS transistor $S_{A1}$ can be connected to zero voltage ($V_1=0$) to be turned on; and a cut-off control voltage of the first MOS transistor $S_{A1}$ can be set to $V_{DD}$, that is, the gate of the first MOS transistor $S_{A1}$ can be connected to a voltage with a value of $V_{DD}$ ($V_1=V_{DD}$) to be cut off.

A turn-on control voltage of the second MOS transistor $S_{A2}$ can be set to 0, that is, a gate of the second MOS transistor $S_{A2}$ can be connected to zero voltage ($V_2=0$) to be turned on; and a cut-off control voltage of the second MOS transistor $S_{A2}$ can be set to $V_{DD}$, that is, the gate of the second MOS transistor $S_{A2}$ can be connected to the voltage with a value of $V_{DD}$ ($V_2=V_{DD}$) to be cut off.

A turn-on control voltage of the third MOS transistor $S_{A3}$ can be set to $V_{DD}$, that is, a gate of the third MOS transistor $S_{A3}$ can be connected to the voltage with a value of $V_{DD}$ ($V_3=V_{DD}$) to be turned on; and a cut-off control voltage $V_3$ of the third MOS transistor $S_{A3}$ can be set to 0, that is, the gate of the third MOS transistor $S_{A3}$ can be connected to zero voltage ($V_3=0$) to be cut off.

A turn-on control voltage of the fourth MOS transistor $S_{B1}$ can be set to 0, that is, a gate of the fourth MOS transistor $S_{B1}$ can be connected to zero voltage ($V_4=0$) to be turned on; and a cut-off control voltage $V_4$ of the fourth MOS transistor $S_{B1}$ can be set to $-V_{DD}$, that is, the gate of the fourth MOS transistor $S_{B1}$ can be connected to the voltage with a value of $-V_{DD}$ ($V_4=-V_{DD}$) to be cut off.

A turn-on control voltage of the fifth MOS transistor $S_{B2}$ can be set to 0, that is, a gate of the fifth MOS transistor $S_{B2}$ can be connected to zero voltage ($V_5=0$) to be turned on; and a cut-off control voltage $V_5$ of the fifth MOS transistor $S_{B2}$ can be set to $-V_{DD}$, that is, the gate of the fifth MOS transistor $S_{B2}$ can be connected to the voltage with a value of ($V_5=-V_{DD}$) to be cut off.

A turn-on control voltage of the sixth MOS transistor $S_{B3}$ can be set to $-V_{DD}$, that is, a gate of the sixth MOS transistor $S_{B3}$ can be connected to the voltage with a value of $-V_{DD}$ ($V_6=-V_{DD}$) to be turned on; and a cut-off control voltage $V_6$ of the sixth MOS transistor $S_{B3}$ can be set to 0, that is, the gate of the sixth MOS transistor $S_{B3}$ can be connected to zero voltage ($V_6=0$) to be cut off.

Similarly, when the capacitance values of the first energy storage capacitor $C_{S1}$ and the second energy storage capacitor $C_{S2}$ are much greater than the equivalent capacitance value $C_L$ of the touch electrode, and the frequency of the driving signal is $f$, driving power consumption of the touch driving circuit provided by this embodiment in one period T is $P=C_L*V_{DD}^2 f$, and a signal amplitude of the driving signal is $2V_{DD}$, where $f=1/T$.

It should be noted that the touch driving circuit provided in the embodiment of the present application can not only adopt two energy storage capacitors, but also can adopt four or more pairs of energy storage capacitors, and each pair of energy storage capacitors is used to provide positive and negative voltages respectively, thus introducing more intermediate levels to achieve lower driving power consumption, however, as the number of energy storage capacitors increases, more peripheral devices are also introduced, which results in increase in cost and complexity of the circuit.

Figure 8:
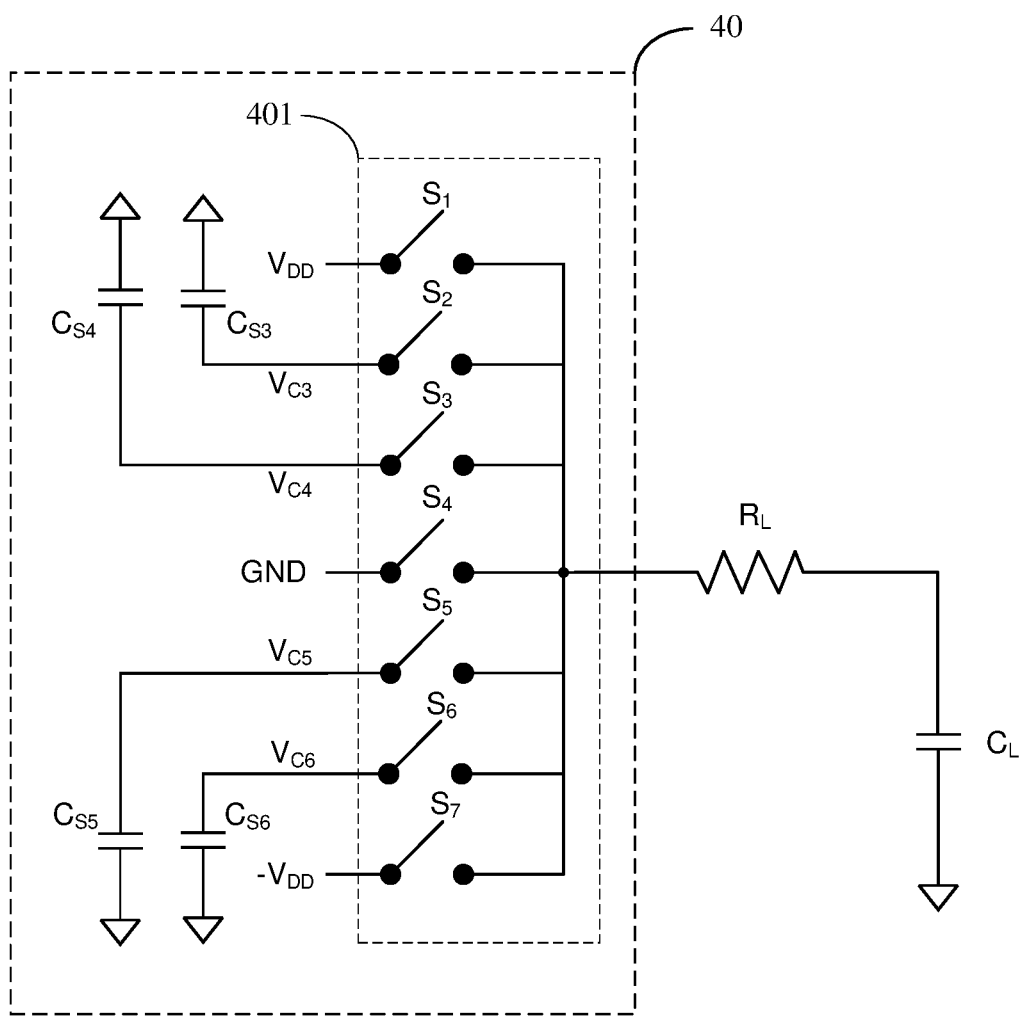
FIG. 8 is a schematic structural diagram of yet another touch driving circuit provided by an embodiment of the present application.

As shown in FIG. 8, it is a schematic structural diagram of yet another touch driving circuit provided by an embodiment of the present application. Please refer to FIG. 8, a touch driving circuit 40 includes a switching circuit 401 and four energy storage capacitors; the four energy storage capacitors are a third energy storage capacitor $C_{S3}$, a fourth energy storage capacitor $C_{S4}$, a fifth energy storage capacitor $C_{S5}$ and a sixth energy storage capacitor $C_{S6}$ respectively; and the switching circuit 401 includes seven switches, namely switch $S_1$, switch $S_2$, switch $S_3$, switch $S_4$, switch $S_5$, switch $S_6$ and switch $S_7$ respectively. A first end of the switch $S_1$ is connected to a power supply voltage $V_{DD}$, a second end of the switch $S_1$ is connected to a touch electrode; a first end of the switch $S_2$ is connected to a first end of the third energy storage capacitor $C_{S3}$, and a second end of the switch $S_2$ is connected to the touch electrode; a first end of the switch $S_3$ is connected to a first end of the fourth energy storage capacitor $C_{S4}$, and a second end of the switch $S_3$ is connected to the touch electrode; a first end of the switch $S_4$ is connected to a ground terminal GND, and a second end of the switch $S_4$ is connected to the touch electrode; a first end of the switch $S_5$ is connected to a first end of the fifth energy storage capacitor $C_{S5}$, and a second end of the switch $S_5$ is connected to the touch electrode; a first end of the switch $S_6$ is connected to a first end of the sixth energy storage capacitor $C_{S6}$, and a second end of the switch $S_6$ is connected to the touch electrode; and a first end of the switch $S_7$ is connected to a power supply voltage $-V_{DD}$, and a second end of the switch $S_7$ is connected to the touch electrode. The power supply voltage $-V_{DD}$ can be obtained by connecting the power supply voltage $V_{DD}$ to a positive and negative voltage conversion circuit.

For ease of description, a voltage at two ends of the third energy storage capacitor $C_{S3}$ is denoted as $V_{C3}$, a voltage at two ends of the fourth energy storage capacitor $C_{S4}$ is denoted as $V_{C4}$, a voltage at two ends of the fifth energy storage capacitor $C_{S5}$ is denoted as $V_{C5}$, and a voltage at two ends of the sixth energy storage capacitor $C_{S6}$ is denoted as $V_{C6}$.

In this embodiment, the four energy storage capacitors introduce four intermediate levels respectively, and the size relationship of the four intermediate levels satisfies: $0<V_{C4}<V_{C3}<V_{DD}$, and $-V_{DD}<V_{C6}<V_{C5}<0$. By setting a turn-on sequence of the seven switches, the touch driving circuit can be made to periodically output the power supply voltage $V_{DD}$, the voltage $V_{C3}$, the voltage $V_{C4}$, zero voltage, the voltage $V_{C5}$, the voltage $V_{C6}$, the power supply voltage $-V_{DD}$, the voltage $V_{C6}$, the voltage $V_{C5}$, the zero voltage, the voltage $V_{C4}$, and the voltage $V_{C3}$ in sequence.

In addition, by setting capacitance values of the four energy storage capacitors to be much greater than the capacitance value of the capacitor $C_L$, it is possible to further make $V_{C3} \approx 2/3 V_{DD}$, $V_{C4} \approx 1/3 V_{DD}$, $V_{C5} \approx -1/3 V_{DD}$, $V_{C6} \approx -2/3 V_{DD}$. Specifically, when the capacitance values of the four energy storage capacitors are 50-100 times greater than the capacitance value of the capacitor $C_L$, it can be determined that the capacitance values of the four energy storage capacitors are much greater than the capacitance value of the capacitor $C_L$. Since actual driving power consumption will be generated only when the power supply voltage directly drives the touch electrode during one period T, driving power consumption generated by the touch driving circuit provided in this embodiment during the one period T is $P = (1/3 V_{DD}) * C_L V_{DD} * 2 = 2/3 C_L * V_{DD}^2 * f$, and a signal amplitude of the driving signal is $2 V_{DD}$, where $f = 1/T$.

Specifically, in this embodiment, each switching circuit may also be implemented by a MOS transistor, and a voltage-bearing transistor may also be set to prevent a voltage at two ends of each MOS transistor from exceeding a withstand voltage value, and the voltage-bearing transistor may also be implemented by a MOS transistor.

Figure 9:
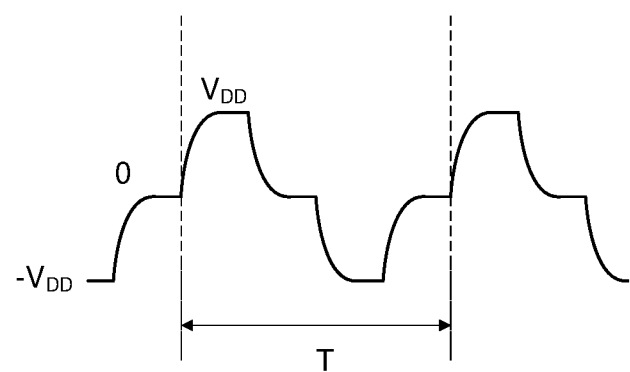
FIG. 9 is a schematic waveform diagram of another driving signal provided by an embodiment of the present application.

It should be noted that the touch driving circuit provided by the embodiment of the present application can also turn on only a part of the switching circuits or MOS transistors in a specific order to generate different driving signals, so as to adapt to different application scenarios. For example, in some application scenarios where lower driving power consumption is not required, a control operation of a switching circuit can be simplified and a period of a driving signal can be shortened. In an example of the touch driving circuit shown in FIG. 3, the touch electrode is controlled to be connected to the first positive voltage $V_{DD}$, the ground, the first negative voltage $-V_{DD}$, and the ground in sequence only during one period T, and a driving signal shown in FIG. 9 can be generated, a signal amplitude of the driving signal is $2 V_{DD}$, and driving power consumption is $2 C_L * V_{DD}^2 * f$.

An embodiment of the present application provides a touch driving chip, and the touch driving chip includes the touch driving circuit provided in the above embodiments.

It should be noted that the touch driving chip may further include another circuit, such as a control circuit for controlling a switching circuit to be periodically turned on according to the turn-on sequence provided by the above embodiments.

An embodiment of the present application provides a touch display device, and the touch display device includes the touch driving chip provided in the above embodiment.

The touch display device may include a display, such as a liquid crystal display, an organic light emitting diode display, a plasma display panel, a cathode ray tube display, and the like.

It should be understood that the specific implementation manners in embodiments of the present application are only to help those skilled in the art better understand the embodiments of the present application, rather than limit the scope of the embodiments of the present application. Those skilled in the art can make various improvements and modifications on the basis of the above embodiments, and these improvements or modifications all fall during the scope of protection of the present application.

What is claimed is:

1. A touch driving circuit configured to output a driving signal to drive a touch electrode of a touch display device, comprising: a power supply voltage generation circuit, a switching circuit, a first energy storage capacitor and a second energy storage capacitor;

wherein a first input end of the switching circuit is connected to the power supply voltage generation circuit; a second input end of the switching circuit is connected to a ground terminal GND through the first energy storage capacitor; a third input end of the switching circuit is connected to the ground terminal GND; wherein a fourth input end of the switching circuit is connected to the ground terminal GND through the second energy storage capacitor; and a fifth input end of the switching circuit is connected to the power supply voltage generation circuit; and an output end of the switching circuit is connected to the touch electrode;

the power supply voltage generation circuit is configured to generate a first positive voltage and a first negative voltage; and the switching circuit is configured to control the touch electrode to be connected to the power supply voltage generation circuit during a first period of time, the touch electrode being charged with the first positive voltage, so that a voltage at two ends of the touch electrode is equal to the first positive voltage; control the touch electrode to be connected to the first energy storage capacitor during a second period of time, the first energy storage capacitor being configured to store charges released by the touch electrode, so that the voltage at the two ends of the touch electrode is equal to a second positive voltage; control the touch electrode to be connected to the ground terminal GND during a third period of time, the touch electrode being discharged to the ground terminal GND, so that the voltage at the two ends of the touch electrode is equal to a zero voltage; control the touch electrode to be connected to the second energy storage capacitor during a fourth period of time, the second energy storage capacitor being configured to transfer the stored charges to the touch electrode, so that the voltage at the two ends of the touch electrode is equal to a second negative voltage; and control the touch electrode to be connected to the power supply voltage generation circuit during a fifth period of time, the touch electrode being charged with the first negative voltage, so that the voltage at the two ends of the touch electrode is equal to the first negative voltage;

where the second positive voltage is lower than the first positive voltage and higher than the zero voltage;

where the second negative voltage is higher than the first positive voltage and lower than the zero voltage.

2. The touch driving circuit according to claim 1, wherein the switching circuit is further configured to control the touch electrode to be connected to the second energy storage capacitor during a sixth period of time, the second energy storage capacitor being configured to store the charges released by the touch electrode, so that the voltages at the two ends of the touch electrode is equal to the second negative voltage; control the touch electrode to be connected to the ground terminal GND during a seventh period of time, the touch electrode being discharged to the ground terminal GND, so that the voltage at the two ends of the touch electrode is equal to the zero voltage; and control the touch electrode to be connected to the first energy storage capacitor during an eighth period of time, the first energy storage capacitor being configured to transfer the stored charges to the touch electrode, so that the voltage at the two ends of the touch electrode is equal to the second positive voltage.

3. The touch driving circuit according to claim 2, wherein the switching circuit further comprises: a first switching circuit, a second switching circuit, a third switching circuit, a fourth switching circuit and a fifth switching circuit;
an input end of the first switching circuit is the first input end of the switching circuit, and an output end of the first switching circuit is connected to the output end of the switching circuit;
an input end of the second switching circuit is the second input end of the switching circuit, and an output end of the second switching circuit is connected to the output end of the switching circuit;
an input end of the third switching circuit is the third input end of the switching circuit, and an output end of the third switching circuit is connected to the output end of the switching circuit;
an input end of the fourth switching circuit is the fourth input end of the switching circuit, and an output end of the fourth switching circuit is connected to the output end of the switching circuit; and
an input end of the fifth switching circuit is the fifth input end of the switching circuit, and an output end of the fifth switching circuit is connected to the output end of the switching circuit.

4. The touch driving circuit according to claim 3, wherein the first switching circuit is turned on during the first period of time; the second switching circuit is turned on during the second period of time; the third switching circuit is turned on during the third period of time; the fourth switching circuit is turned on during the fourth period of time; the fifth switching circuit is turned on during the fifth period of time; the fourth switching circuit is turned on during the sixth period of time; the third switching circuit is turned on during the seventh period of time; and the second switching circuit is turned on during the eighth period of time; and
when any of switching circuits is turned on, other four switching circuits are all turned off.

5. The touch driving circuit according to claim 4, further comprising a first voltage-bearing transistor and a second voltage-bearing transistor;
the first switching circuit further comprises a first MOS transistor; the second switching circuit further comprises a second MOS transistor; the fourth switching circuit further comprises a fourth MOS transistor; the fifth switching circuit further comprises a fifth MOS transistor; and the third switching circuit further comprises a third MOS transistor and a sixth MOS transistor;
the first MOS transistor, the sixth MOS transistor and the first voltage-bearing transistor are P-type MOS transistors, and the second MOS transistor, the third MOS transistor, the fourth MOS transistor, the fifth MOS transistor and the second voltage-bearing transistor are N-type MOS transistors;
a source of the first MOS transistor is connected to the first positive voltage, and a drain of the first MOS transistor is connected to a source of the first voltage-bearing transistor;
a source of the second MOS transistor is connected to the source of the first voltage-bearing transistor, and a drain of the second MOS transistor is connected to a first end of the first energy storage capacitor;
a source of the third MOS transistor is connected to the ground terminal GND, and a drain of the third MOS transistor is connected to the source of the first voltage-bearing transistor;
a source of the fourth MOS transistor is connected to a first end of the second energy storage capacitor, and a drain of the fourth MOS transistor is connected to a source of the second voltage-bearing transistor;
a source of the fifth MOS transistor is connected to the first negative voltage, and a drain of the fifth MOS transistor is connected to the source of the second voltage-bearing transistor;
a source of the sixth MOS transistor is connected to the ground terminal GND, and a drain of the sixth MOS transistor is connected to the source of the second voltage-bearing transistor;
second ends of the first energy storage capacitor and the second energy storage capacitor are both connected to the ground terminal GND; and drains of the first voltage-bearing transistor and the second voltage-bearing transistor are both connected to the touch electrode; and
the first voltage-bearing transistor is configured to prevent voltages at two ends of the first MOS transistor, the second MOS transistor and the third MOS transistor from exceeding a withstand voltage; and the second voltage-bearing transistor is configured to prevent voltages at two ends of the fourth MOS transistor, the fifth MOS transistor and the sixth MOS transistor from exceeding a withstand voltage.

6. The touch driving circuit according to claim 5, wherein during the first period of time, the first MOS transistor is turned on, gates of the first voltage-bearing transistor and the second voltage-bearing transistor are connected to the ground terminal GND, and other five MOS transistors are cut off;
during the second period of time, the second MOS transistor is turned on, the gates of the first voltage-bearing transistor and the second voltage-bearing transistor are connected to the ground terminal GND, and the other five MOS transistors are cut off;
during the third period of time, the third MOS transistor is turned on, a voltage connected to a gate of the first voltage-bearing transistor is equal to a difference obtained by subtracting the first positive voltage from the second positive voltage, a gate of the second voltage-bearing transistor is connected to the ground terminal GND, and the other five MOS transistors are cut off;
during the fourth period of time, the fourth MOS transistor is turned on, the gates of the first voltage-bearing transistor and the second voltage-bearing transistor are connected to the ground terminal GND, and the other five MOS transistors are cut off;
during the fifth period of time, the fifth MOS transistor is turned on, the gates of the first voltage-bearing transistor and the second voltage-bearing transistor are connected to the ground terminal GND, and the other five MOS transistors are cut off;
during the sixth period of time, the fourth MOS transistor is turned on, the gates of the first voltage-bearing transistor and the second voltage-bearing transistor are connected to the ground terminal GND, and the other five MOS transistors are cut off;
during the seventh period of time, the sixth MOS transistor is turned on, the gate of the first voltage-bearing transistor is connected to the ground terminal GND, a voltage connected to the gate of the second voltage-bearing transistor is equal to a difference obtained by subtracting the first negative voltage from the second negative voltage, and the other five MOS transistors are cut off; and during the eighth period of time, the second MOS transistor is turned on, the gates of the first voltage-bearing transistor and the second voltage-bearing transistor are connected to the ground terminal GND, and the other five MOS transistors are cut off.

7. The touch driving circuit according to claim 2, wherein a signal amplitude of the driving signal during one period is equal to the first positive voltage, the second positive voltage, the zero voltage, the second negative voltage, the first negative voltage, the second negative voltage, the zero voltage, and the second positive voltage in sequence.

8. The touch driving circuit according to claim 1, wherein the power supply voltage generation circuit further comprises a positive and negative voltage conversion circuit; and the positive and negative voltage conversion circuit is configured to convert the first positive voltage into the first negative voltage.

9. The touch driving circuit according to claim 1, wherein a capacitance value of the first energy storage capacitor or the second energy storage capacitor is 50 times greater than an equivalent capacitance value of the touch electrode.

10. The touch driving circuit according to claim 9, wherein the second positive voltage is equal to ½ of the first positive voltage, and the second negative voltage is equal to ½ of the first negative voltage.

11. A touch driving chip, comprising the touch driving circuit according to claim 1.

12. A touch display device, comprising the touch driving chip according to claim 11.

* * * * *